Feb. 6, 1962  E. F. GORMAN  3,020,389
PORTABLE AIR LOCK FOR WELDING CHAMBERS
Filed Nov. 10, 1958  2 Sheets-Sheet 1
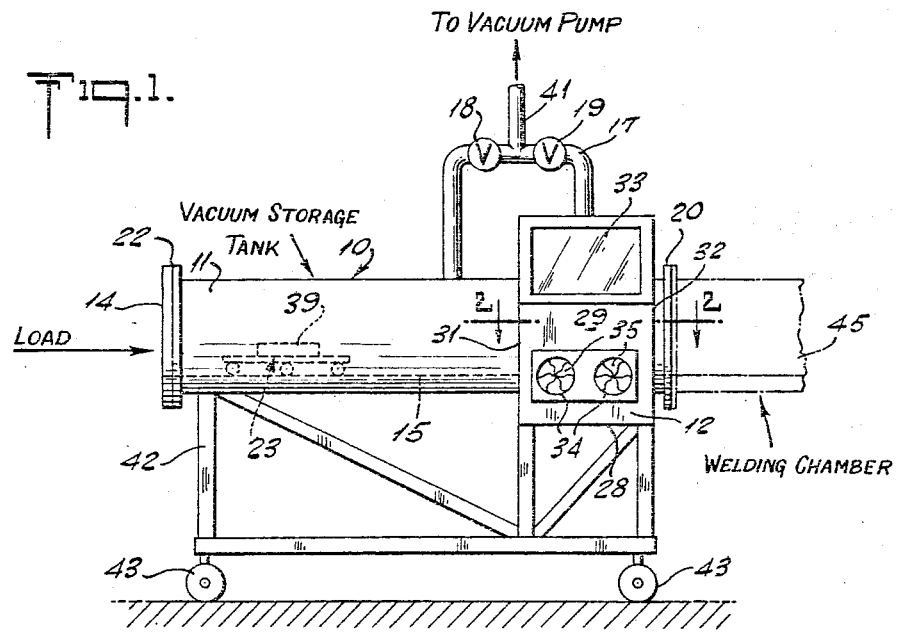
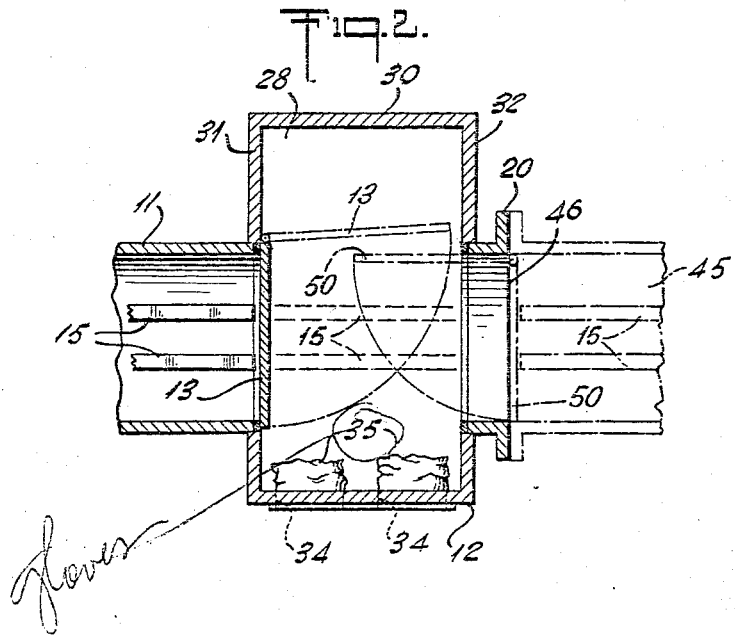
INVENTOR
EUGENE F. GORMAN
BY *William F. Mesinger*
ATTORNEY

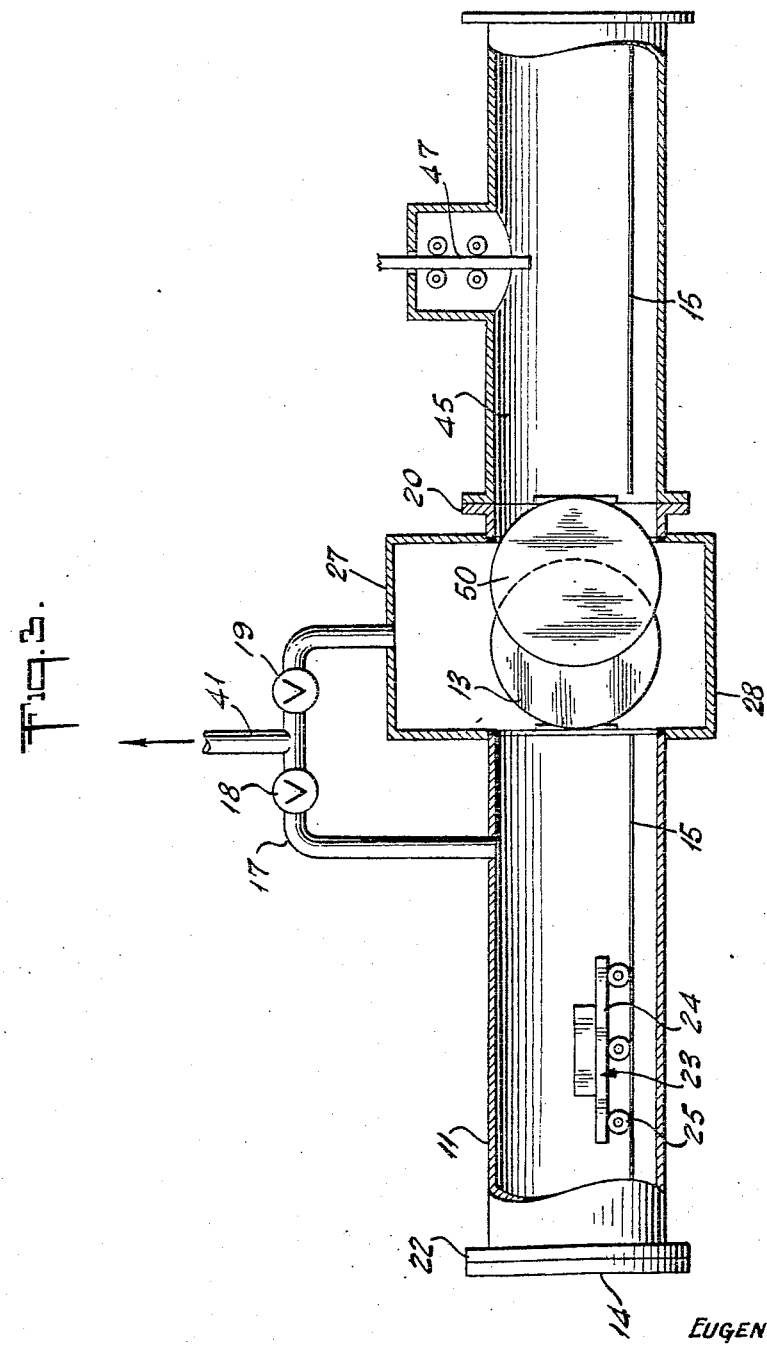

United States Patent Office 3,020,389
Patented Feb. 6, 1962

3,020,389
PORTABLE AIR LOCK FOR WELDING CHAMBERS
Eugene F. Gorman, Rutherford, N.J., assignor to Union Carbide Corporation, a corporation of New York
Filed Nov. 10, 1958, Ser. No. 772,736
4 Claims. (Cl. 219—72)

This invention relates to a method and apparatus for outgassing and storing fabricated parts prior to treatment in a controlled atmosphere. It refers in particular to an apparatus for storing and outgassing weldment components prior to welding.

The increased commercial usage of titanium, zirconium, and other highly reactive metals, particularly in specialized applications, as demanded by the nuclear and aircraft industries, has resulted in a corresponding increase in the use of controlled atmospheres for welding and fabrication of equipment. Such metal working operations as welding, brazing, heat treating, etc., of these highly reactive metals, require a controlled inert gas atmosphere to prevent contamination since, even at moderately high temperatures, these metals tend to react with or dissolve all elements other than the inert gases.

Outgassing is a means whereby gases such as oxygen, nitrogen, moisture, etc., adhering to a metallic surface, are released therefrom to provide a relatively gas free surface. The reason for disposing of these undesirable gases is particularly emphasized when considered in relation to the welding of metallic components. When the welding operation is being performed in a closely controlled atmosphere, the heat developed over a period of time will gradually release the gases from the metallic surface, thereby contaminating the controlled surrounding atmosphere.

While the weldment, under ordinary conditions, will be apparently free of defects, at elevated temperature such as produced by contact with hot fluids, the welded part will be noticeably defective. In nuclear power applications, for example, the presence of such contaminants seriously impair the corrosion resistance of the zirconium weldments. It is therefore necessary, in order to avoid such defects, to remove as much of the surface gas as possible prior to the actual welding operation.

It has been found that outgassing may be accomplished by: (1) lowering the pressure on the metal part to permit a separation of the gas molecules; (2) heating of the part to thermally free the surface entrapped gases; or (3) using a combination of the first two methods.

A number of controlled atmosphere chambers, adaptable for welding or heat treating parts, have been developed for such operations. The present practice in the use of welding chambers, for instance, is for the workpiece to be preassembled outside of the chamber, then moved into the chamber for the actual welding operation.

In one welding application, for example, the workpiece is in the form of an elongated column which is mounted on a rolling carriage. The workpiece and carriage are inserted into the welding chamber and rolled on tracks past the welding head, disposed within a box-like stainless steel enclosure. Before the welding operation is commenced, the welding chamber with the workpiece inside is sealed closed and evacuated to a pressure of approximately 0.03 micron of mercury; this evacuation is continued for eight or more hours to outgas all internal surfaces of the workpiece and chamber and to remove gaseous impurities.

Although shorter periods of outgassing may suffice, depending upon the duration of the welding operations, many such operations require welding periods of up to approximately 16 hours. Over such an extended welding period, if the components had not been previously outgassed, they would gradually become degassed to contaminate the otherwise closely controlled atmosphere.

In accordance with the usual practice involving controlled atmosphere chambers after the completion of the vacuum purging step, the chamber is back filled with an inert gas, such as argon or helium to atmospheric pressure, and the welding operation started.

Welding chamber extensions generally located at either or both ends of the welding enclosure, are cylindrical in shape and permit the workpiece to be welded along its entire length and then returned to its starting position while still within the confines of the purged chamber. On completion of the welding operation, the weldment is removed through a hinged door at the end of a chamber extension and a new workpiece is substituted. This transfer of workpieces of course exposes the welding chamber to the room atmosphere, thereby requiring another extended pumpdown cycle to recondition the welding chamber for the next operation.

The overall result of these long welding chamber conditioning periods, then, is an inefficient and low rate of productivity; in many instances only one weldment per day can be made in a chamber.

The problem of low productivity has been overcome to some extent by providing welding chambers which incorporate built-in vacuum air locks. In the operation of this type of apparatus, the assembled workpiece is placed in the air lock, which is then evacuated and provided with an inert atmosphere. A gas tight connecting door between the air lock and the welding chamber proper is then opened and the workpiece transferred into the previously conditioned welding chamber. Simultaneously, the finished weldment is removed and replaced through the air lock so that the welding chamber itself is never exposed to the atmosphere and, therefore, does not require the extended periods of conditioning between the welding of successive workpieces. An additional advantage in this apparatus resides in the production time saved since the second workpiece is being outgassed as the first workpiece is being welded.

While there are many desirable features inherent in the use of an attached air lock, the primary disadvantage to its use is the fact that it greatly increases the cost of the already expensive welding chamber. Also, the size of the combination unit tends toward rather unwieldly proportions.

It is therefore an object of the present invention to provide an apparatus for pre-treating and storing parts prior to being further subjected to a controlled atmosphere operation.

A further object is to provide an apparatus which allows a more economical and less time consuming controlled atmosphere operation.

Another object is to provide a method and apparatus for outgassing weldment components prior to being welded.

In the drawings:
FIG. 1 is a side elevation of an embodiment of the invention,
FIG. 2 is a partial section taken through FIG. 1, and
FIG. 3 is a cross sectional elevation of the invention shown in co-operating relationship with an electric arc welding device.

With reference to the drawings, the invention contemplates a portable air lock 10 as shown in FIG. 1 comprising essentially a first chamber or vacuum storage tank 11 for degassing and storing pre-assembled workpieces; a second or pre-welding chamber 12 joined therewith and separated therefrom by a hinged panel 13 for sealing the vacuum storage tank. A loading door 14 seals the entrance to the tank 11 and permits access to the tracks 15 for supporting workpieces. A manifold 17, including valves 18 and 19 and an external connection 41, communicates the pre-welding chamber 12 with the tank 11. A sealing flange 20 provides means whereby the air lock 10 is joined to an adjacent welding chamber 45, maintaining an air tight seal therebetween.

The vacuum storage tank 11 comprises an elongated chamber having preferably a cylindrical configuration to provide adequate strength under reduced internal pressure. The access end of the tank is provided with a loading door 14 in hinged relation to the tank and held securely against the tank flange 22 with a gasket or similar sealing device compressed therebetween. A series of circumferentially located bolts or suitable locks permit the door 14 to be readily secured in place or opened for loading of pre-assembled weldment components into the storage tank 11.

A track 15 axially disposed within the tank 11 supports a carriage 23 or similar movable platform upon which the pre-assembled weldment parts rest. One form of carriage, as shown in FIG. 3, includes a bed plate 24 to which is mounted a plurality of wheels 25 in spaced alignment with the track 15. This arrangement permits weldment components to be positioned on the carriage and conveniently rolled into the vacuum chamber 11, and thence into the pre-welding and welding chambers.

The pre-welding chamber 12, as illustrated in FIGS. 1, 2 and 3, comprises essentially a box-like structure having a top 27, a bottom 28, front and rear panels 29 and 30 respectively, and oppositely disposed ends 31 and 32. The front panel 29 is provided with a window 33 to permit viewing of the interior of said chamber. The front panel 29 is also provided with a pair of glove ports 34 into which flexible gloves 35 are tightly fitted to permit external manipulation of the weldment components.

One end 31 of the pre-welding chamber 12 is joined to the vacuum storage tank 12 by means of an air tight weld or seal. The hinged panel 13, located to form a closure to said end 31, is disposed to swing into the pre-welding chamber 12 thereby permitting passage of the carriage 23 into said chamber. In the closed position this panel 13 sealably isolates the storage tank 11 to permit evacuation of said tank independently of the pre-welding chamber.

The other end 32 of the pre-welding chamber 12 is provided with a flange 20 adapted to register with a corresponding flange on the welding apparatus. A resilient gasket integral with the flange provides an air tight sealing means when said flanges are pulled into tight abutting relation by suitable bolts or clamping means. When drawn into such relationship as illustrated by FIG. 3, the pre-welding chamber 12 and the welding apparatus 45 provide a passage thereby permitting the carriage 23 and weldment components 39 to be positioned for welding under the welding head 47. By passing the carriage beneath the welding apparatus either by hand or mechanical means, a seam weld or series of welds may be made on the weldments.

The manifold unit 17 communicating with both the storage tank 11 and pre-welding chamber 12 is provided with an outlet 41 which may be connected to a vacuum pumping means and to a suitable supply of inert gas. By manipulation of control valves 18 and 19, the storage tank 11 and the pre-welding chamber 12 may be independently conditioned for the purpose of outgassing prior to a welding operation.

The entire air lock is mounted and secured on a frame 42 which is provided with suitable wheels or casters 43 to allow movement of the unit such as between several different welding chambers. The wheels may be adapted to roll within guiding tracks, or to merely swivel independently. To limit such motion, wheel locks or similar devices may be provided for positioning the frame in its desired location. Alignment or levelling of the air lock unit in relation to other equipment, notably a welding chamber such as 45, is performed through use of a quick levelling arrangement on the lower side of the frame 42. This may also be accomplished through the use of a flexible extension on the pre-welding chamber 12 which facilitates alignment of the pre-welding chamber with the loading port on the welding chamber.

An understanding of the operation of portable air locks may be had from the following description made with reference to FIG. 3 of the drawings.

Several workpieces or pre-assembled weldment components 39 to be welded are assembled and placed on the carriages 23. These carriages are then inserted through the loading door and placed in movable "slots" provided in the storage tank 12 of the air lock, one "slot" being left vacant to receive a completed weldment from the welding chamber. Any suitable means may be used for rotating or moving the "slots" into alignment with the interconnecting panel 13 between the storage tank 11 and pre-welding chamber 12. For example, the slots may be supported on a "Ferris wheel." Any single slot can therefore be aligned with the tract in the pre-welding and welding chambers merely by rotating the "Ferris wheel."

The loading door 14 and panel 13 are then securely closed and the storage tank 11 evacuated by a suitable vacuum system to which the manifold 17 is connected for a period sufficient to completely outgas the pre-assembled workpieces.

The storage tank 11 is then back filled through the manifold 17 or another port, with an inert gas. The air lock is now ready to service several welding chambers, the number depending upon the number of "slots" provided in the storage tank. The long pumpdown cycle of the storage tank need not be repeated until the number of unwelded workpieces becomes exhausted and it is opened to the air to insert a new group of workpieces.

With reference to FIG. 3, in order to effect the transfer of a workpiece from the storage tank 11 into the welding chamber, and to remove the completed weldment, the flange 20 of the pre-welding chamber 12 is air tightly attached to the welding chamber 45 at its loading port 46. After being so connected by suitable locking means, the pre-welding chamber 12 is evacuated by a quick pump down of a few minutes' duration. This may be accomplished by a vacuum pumping unit attached to the manifold 17.

The pre-welding chamber is next back filled with inert gas to equalize the pressure between pre-welding chamber 12 and the welding chamber 45. The welding chamber loading door 50 is then opened into the pre-welding chamber and the completed weldment removed from the chamber through the pre-welding chamber and into the empty slot in the storage tank. In like manner, a new workpiece then passed into the welding chamber from the storage tank. After the exchange is made, the door 50 and panel 13 are closed, the air lock is disengaged from the welding chamber 45, and subsequently attached to the next chamber. The exchange of workpieces need not be accomplished by hand, but may be made automatically by remote control, or the operation can also be performed through the gloved ports 34.

It is readily seen that by opening the welding chamber door 50 into a pre-conditioned air lock in which provision is made for exchanging a completed weldment for a new workpiece, the working atmospheric condition of the welding chamber 45 is preserved intact. The protracted periods of evacuation for outgassing are thus confined to the storage tank, only resulting in greatly increased productivity of the welding chambers.

Because of complicated jigging and fixturing, it may be necessary to assemble the workpiece in the welding chamber itself. Under such conditions, component parts of the workpiece may be pre-conditioned or outgassed in the portable air lock so that the need for outgassing of the assembled workpiece in the welding chamber is eliminated.

For situations where size or weight limitations make it impractical to store more than one workpiece in a portable air lock, it may be desirable to operate the portable air lock in conjunction with a second air lock. The second or main storage lock, designed to store several new workpieces, could be installed in a fixed position in either the welding or assembly shops. The long pumpdown cycle would be applied to this second air lock only. The portable air lock could then act as a shuttle between the welding chambers and the main storage lock. In this event, quick pumpdowns could be used on both sections of the portable air lock when removing a completed weldment or when inserting a new workpiece.

What is claimed is:

1. In combination with an evacuable welding chamber having an access port including a removable gas tight closure co-operating therewith, an apparatus for outgassing metal parts in a controlled atmosphere and for maintaining said parts in said controlled atmosphere prior to introduction thereof to said welding chamber which is also maintained under a similar controlled atmosphere, said apparatus comprising: a first and second chamber, said first chamber including an outlet port having a removable sealing closure therefor, means for controlling the atmosphere in said first chamber, said outlet port communicating with said second chamber and being sealably separable therefrom by said removable closure, said second chamber having an access port adaptable to sealably engage the access port in said welding chamber.

2. In combination with an evacuable welding chamber having an access port including a removable gas tight closure co-operating therewith, an apparatus for outgassing metal parts in a controlled atmosphere and for maintaining said parts in said controlled atmosphere prior to introduction thereof to said welding chamber which is also maintained under a similar controlled atmosphere, said apparatus comprising: a first chamber for storing and outgassing said metal parts, means for controlling the atmosphere in said chamber, a second chamber communicably joined with said first chamber for receiving said parts, and a displaceable sealing panel disposed intermediate said chambers, said first chamber having an access opening, a removable closure for gas tightly sealing said opening, said second chamber adapted to sealably engage the access port in said welding chamber and means for controlling the atmosphere in said chamber when said chamber is sealably engaged with said access port.

3. In combination with a controlled atmosphere welding chamber having a flanged port including a removable gas tight closure co-operating therewith to define an access opening, an apparatus for pretreating metal parts in a controlled atmosphere and maintaining said parts in said atmosphere prior to and during the transfer of said parts to the welding chamber, said apparatus being removably engageable with said welding chamber and comprising: a first chamber having opposed ends, a removable air tight panel at each of said ends defining an air tight enclosure, means for providing said chamber with a controlled atmosphere, a second chamber communicably joined to said first chamber and separated therefrom by one of said panels, said second chamber having a flanged opening adaptable to engage the flanged port in said welding chamber for forming a gas tight seal therewith, and a valved conduit communicating with said first and second chambers for providing a controlled atmosphere therefor when said second chamber and said welding chamber are gas tightly engaged.

4. In combination with a controlled atmosphere welding chamber having a flanged port including a removable gas tight closure co-operating therewith to define an access opening, a removable apparatus for pretreating metal parts in a controlled atmosphere and maintaining said parts in said atmosphere prior to and during transfer of said parts to the welding chamber, said apparatus comprising: an elongated chamber having opposed ends, a removable gas tightly sealable panel at each of said ends defining an evacuable chamber therebetween, a valved conduit communicating said evacuable chamber with a second chamber and sealably separated therefrom by one of said sealable panels, said second chamber having a flanged opening for engaging the flanged port in said welding chamber to form an air tight seal therewith and to define an evacuable chamber intermediate said gas tight closure and said sealable panel, a conduit communicating said second chamber with a controlled atmosphere source for providing said second chamber with a controlled atmosphere when sealably engaged with the welding chamber, and means for removing said gas tight closure and said sealable panel to transfer the metal parts when the respective chambers are so engaged.

References Cited in the file of this patent

UNITED STATES PATENTS

| | | |
|---|---|---|
| 2,053,417 | Brace | Sept. 8, 1936 |
| 2,269,838 | Wroblewski | Jan. 13, 1942 |
| 2,446,403 | Bassereau | Aug. 3, 1948 |
| 2,602,871 | Noland et al. | July 8, 1952 |
| 2,746,420 | Steigerwald | May 22, 1956 |